US006412022B1

(12) United States Patent
Kumpf et al.

(10) Patent No.: US 6,412,022 B1
(45) Date of Patent: Jun. 25, 2002

(54) SIMULTANEOUS PRINT AND SCAN LOGICAL CHANNEL NETWORK MULTIFUNCTION PERIPHERAL

(75) Inventors: David A Kumpf, Rocklin; Glenn R Garcia, Grass Valley; Daniel R Pearson, Roseville; Dean L Scoville, Auburn, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/164,454

(22) Filed: Sep. 30, 1998

(51) Int. Cl.[7] .............................................. G06F 13/00
(52) U.S. Cl. ................... 710/1; 710/20; 710/58
(58) Field of Search ........................... 710/1, 3, 20, 36, 710/40, 131, 5, 7, 21, 58, 15

(56) References Cited

U.S. PATENT DOCUMENTS

| 4,821,259 A | * | 4/1989 | DeBruler et al. ............. 370/60 |
| 5,453,982 A | * | 9/1995 | Pennington et al. ........ 370/85.1 |
| 5,678,007 A | * | 10/1997 | Hurvig ....................... 709/200 |
| 5,680,228 A | * | 10/1997 | Kirmeier ..................... 358/474 |
| 5,720,013 A | * | 2/1998 | Uda et al. .................. 358/1.13 |
| 5,724,555 A | * | 3/1998 | Wadsworth ................. 395/500 |
| 5,748,613 A | * | 5/1998 | Kilk et al. .................... 370/231 |
| 5,764,866 A | * | 9/1998 | Maniwa ..................... 358/1.15 |
| 5,933,580 A | * | 8/1999 | Uda et al. .................. 358/1.13 |
| 5,991,055 A | * | 11/1999 | Hasselby et al. ........... 358/509 |
| 6,000,867 A | * | 12/1999 | Yoshii et al. ................ 400/188 |
| 6,125,372 A | * | 9/2000 | White ........................ 707/205 |

* cited by examiner

Primary Examiner—Thomas Lee
Assistant Examiner—Rijue Mai

(57) ABSTRACT

A network multifunction peripheral server permits simultaneous processing of print and scan jobs from one or more networked clients. The server of the invention connects to a network through a network interface unit, preferably capable of communication via a plurality of predetermined network protocols. It includes one or more ports for connection to a multifunction peripheral through a communication link. Separate print and scan data flows are established for each port by the server. The server also establishes separate logical channels to the port through a protocol which allows multiple logical channels per communication link. Print and scan jobs are handled simultaneously for a single multifunction peripheral through separate print and scan data channels logically established by the server.

14 Claims, 3 Drawing Sheets

SIMULTANEOUS PRINT AND SCAN LOGICAL CHANNEL NETWORK MULTIFUNCTION PERIPHERAL

FIELD OF THE INVENTION

The present invention generally relates to software and firmware control of multifunction peripheral devices in a network through a server that connects to the network. More particularly, the present invention provides for the simultaneous control and resultant operation of the dual print and scan functions of a multifunction scan and print peripheral device in response to client requests over a network.

BACKGROUND OF THE INVENTION

Scanners are becoming popular devices as images become a more common part of normal computer usage. These devices generally support the conversion of an image on paper to a usable data file. As with all computer equipment, one impediment to further use is cost, which is multiplied by the number of peripheral devices that a user needs to obtain inputs and outputs. Though peripherals are generally low cost devices, compared for example to highly expensive multifunction copiers which are sometimes connected to networks, it is still preferable to limit the number of peripherals through sharing over a network. This concern leads generally to the sharing of peripheral devices over a network, e.g., the common case where multiple users on a network share a printer. To this end, devices have been developed which combine functions previously handled by a dedicated device. These multifunction peripherals (MFPs) combine, for example, printing, scanning and other functions into a single low cost addressable device. Apart from cost, this also conserves the number of ports used by peripheral devices, which may be limited in a given network configuration.

A problem with sharing a device on the network is contention. Contention occurs when multiple users attempt to access the same device simultaneously. For example, two users may try to initiate a print from their local personal computers (PC) to the same network peripheral. Contention occurs since the peripheral can only handle one print request at a time. Generally, the end solution in contention resolution involves a compromise in allowing access to the particular peripheral being contended for.

These problems may be increased by conventional use of multifunction peripherals like combined scan and print peripherals. Scan jobs generate considerable data which may substantially delay printing by any device relying on the same peripheral for its printing service. Conventional separate print and scan servers provide no ability to combine effective management of the separate functions. As a result, a networked computer using a dedicated server device to connect the peripheral to a network port could not scan from their multifunction peripheral where the peripheral was served by a conventional network print server.

Accordingly, it is a primary object of the present invention to provide an improved network peripheral server which supports a simultaneous print and scan function of a capable multifunction peripheral being controlled by the server.

An additional object of the present invention is to provide an improved network peripheral server which maintains logically separate print and scan data flows between the server and the multifunction peripheral being controlled by the server.

Another object of the present invention is to provide an improved network peripheral server which supports multiple communication channels between the server and peripheral.

A further object of the present invention is to provide an improved network peripheral server which supports multiple and potentially different protocol multifunction peripherals and supports a simultaneous print and scan function from one or more of the multiple and potentially different protocol peripherals, and which achieves aforementioned objects of the invention for one or more of the multiple peripherals.

Still another object of the present invention is to provide an improved network peripheral server which supports a simultaneous print and scan from an attached peripheral capable of printing and scanning and which allocates logical print and scan channels to permit progress in both print and scan functions.

A still further object of the present invention is to provide an improved network peripheral server which supports a simultaneous print and scan from an attached peripheral capable of printing and scanning, provides for logically separate print and scan data flows, and reserves a pool of data buffers for each separate data channel.

Yet another object of the present invention is to provide such an improved network peripheral server achieving all or some of the aforementioned objects which can run on various network operating systems and with various peripheral protocols.

SUMMARY OF THE INVENTION

These and other objects are met or exceeded by the present network multifunction peripheral server. The server of the invention connects to a network through a network interface unit, preferably capable of communication via a plurality of predetermined network protocols. It includes one or more ports for connection to a multifunction peripheral through a communication link. Separate print and scan data flows are established for each port by the server. The server also establishes separate logical channels to the port through a protocol which allows multiple logical channels per communication link. Print and scan jobs are handled simultaneously for a single multifunction peripheral through separate print and scan data channels logically established by the server. A preferred embodiment alternates print and scan data packet exchange, using separate print and scan data queues for each multifunction peripheral port of the server. Additional preferred features include time out closing of established scan channels and client transmission failure closing of channels.

BRIEF DESCRIPTION OF THE DRAWINGS

Other objects and advantages will become apparent upon reading the following detailed description, in conjunction with the attached drawings, in which.

DETAILED DESCRIPTION OF THE INVENTION

Broadly stated, the present invention is directed to a server that is directly connectable to a network port and a multifunction peripheral having print and scan functions and which enables simultaneous operation of the print and scan functions of the peripheral. Logical data flows are separately maintained by the server for the separate print and scan functions while ensuring that each of the separate data flows is allocated bandwidth to access the multifunction peripheral under simultaneous access conditions. The physical condition of a server constructed according to the invention may take different forms, and artisans will appreciate that the particular physical form, e.g., a peripheral card, an external box or other physical manifestation incorporating software or firmware accomplishing the invention, is unimportant to the invention and does not limit it.

A preferred physical manifestation of the server of the invention is software and firmware within a Hewlett-Packard JETDIRECT™ EX box. The JETDIRECT™ EX box is an external device for connecting a network of computers to peripherals like scanners or printers. The general nature of the JETDIRECT™ EX box is shown and described in a user manual part no. 5967-2290, which is incorporated by reference herein. Hewlett-Packard JETDIRECT™ servers also come in other forms, such as an internal card. It should therefore be understood, however, that the functions of the JETDIRECT™ EX box can be performed, for example, as part of a card that connects via a bus interface to the peripheral, or as part of an internal central processing unit (CPU) of the peripheral. Any of the JETDIRECT™ servers provide an efficient means to connect a peripheral to a network, but are merely one preferred example of a physical device that is used to implement the server of the present invention. The present invention is also not limited by a specific network protocol, such as the widely used IPX and TCP/IP protocols, but is generally applicable to various protocols including the IPX and TCP/IP protocols. The protocol of the peripheral may also vary.

Figure 1:
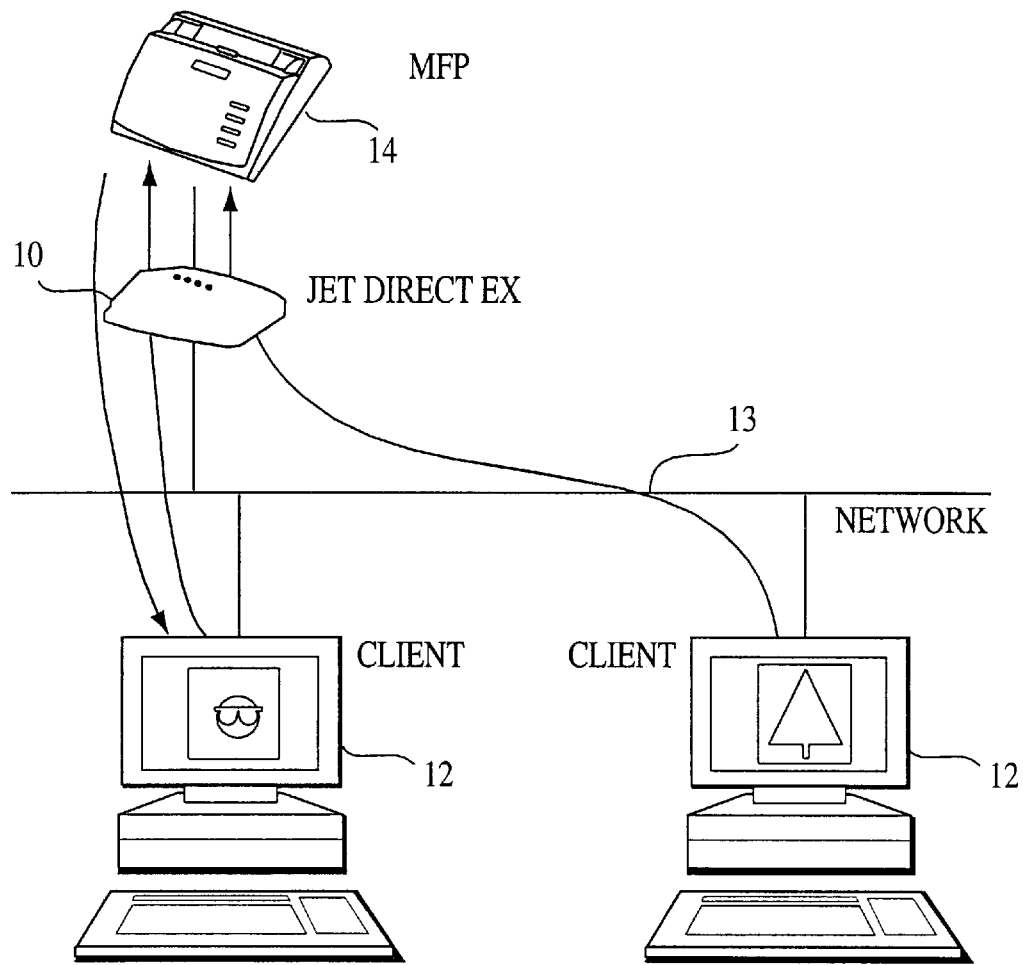
FIG. 1 shows a preferred connection configuration for a multifunction peripheral attached to a network via a server constructed in accordance with the present invention.

Referring now to FIG. 1, a server 10 of the present invention which performs simultaneous print and scan control is shown in a preferred network connection configuration. While the server 10 referred to is part of a Hewlett-Packard JETDIRECT™ EX box package, it is contemplated that the server 10 can be part of a card that connects via a bus interface to the peripheral, or as part of an internal central processing unit (CPU) of the peripheral. The server 10 connects a client 12, typically a PC, through a network 13 to one or more multifunction peripherals (MFPs) 14 that support simultaneous print and scan functions through ports 15. Generally, separate scan and print paper paths are required for simultaneous print and scan functions, in addition to the necessary conventional hardware to accomplish each function in the MFP 14.

According to the invention, the separate print and scan functions of the MFP 14 may be used in simultaneous fashion to serve a single or multiple clients requesting separate print and scan operations through the network 13 via a network interface unit (NIU). A separate communication link 16 connects the server 10 of the invention and the MFP 14, as is logically represented in FIG. 2. Thus, the server 10 may simultaneously enable, for example, a scan to be initiated by one client 12 connected to the network 13 and a print by another client 12 connected to the network. Similarly, the server 10 may simultaneously enable a separate print and scan from a single client on the network. Further, in the case illustrated in FIG. 2, the connection of two MFPs 14 permits up to four simultaneous peripheral operations, namely two prints and two scans assuming that the prints and scans are addressed to separate MFPs A and B. Though two are illustrated, artisans will appreciate additional MFPs with associated addition of simultaneous print and scan operations are within the scope of the invention. A preferred connection is of three MFPs to a single server 10.

The communication link 16 may physically comprise a parallel cable conforming to the IEEE 1284 specification. Alternatively, it might be a PCI bus, or a serial cable such as RS-232, USB, or IEEE 1394. Other links are also possible, and will be generally acceptable if they are able to transmit data packets at sufficiently high rates required by typical print and scan connections. The server 10 also includes a conventional network interface unit (NIU) for connection to the network 13. The NIU handles data transmission according to the specific protocol for the network 13 to which the server 10 is connected, such as an IPX or TCP/IP protocol. The NIU preferably also handles communications from networks which support multiple protocols from clients using separate protocols for network communication.

Communication between MFPs 14 and the server 10 of the invention over the communication links 16 is by a protocol which permits maintenance of multiple logical channels per communication link. The preferred protocol is the Hewlett Packard MLC protocol described in U.S. Pat. No. 5,453,982, Packet Control Procedure Between a Host Processor and a Peripheral Unit, Sep. 26, 1995 to Pennington et al., which is incorporated by reference herein. Alternate protocols, such as the IEEE 1284.4 protocol currently being developed by the IEEE are suitable so long as they have the ability to maintain multiple logical channels per communication link.

Figure 2:
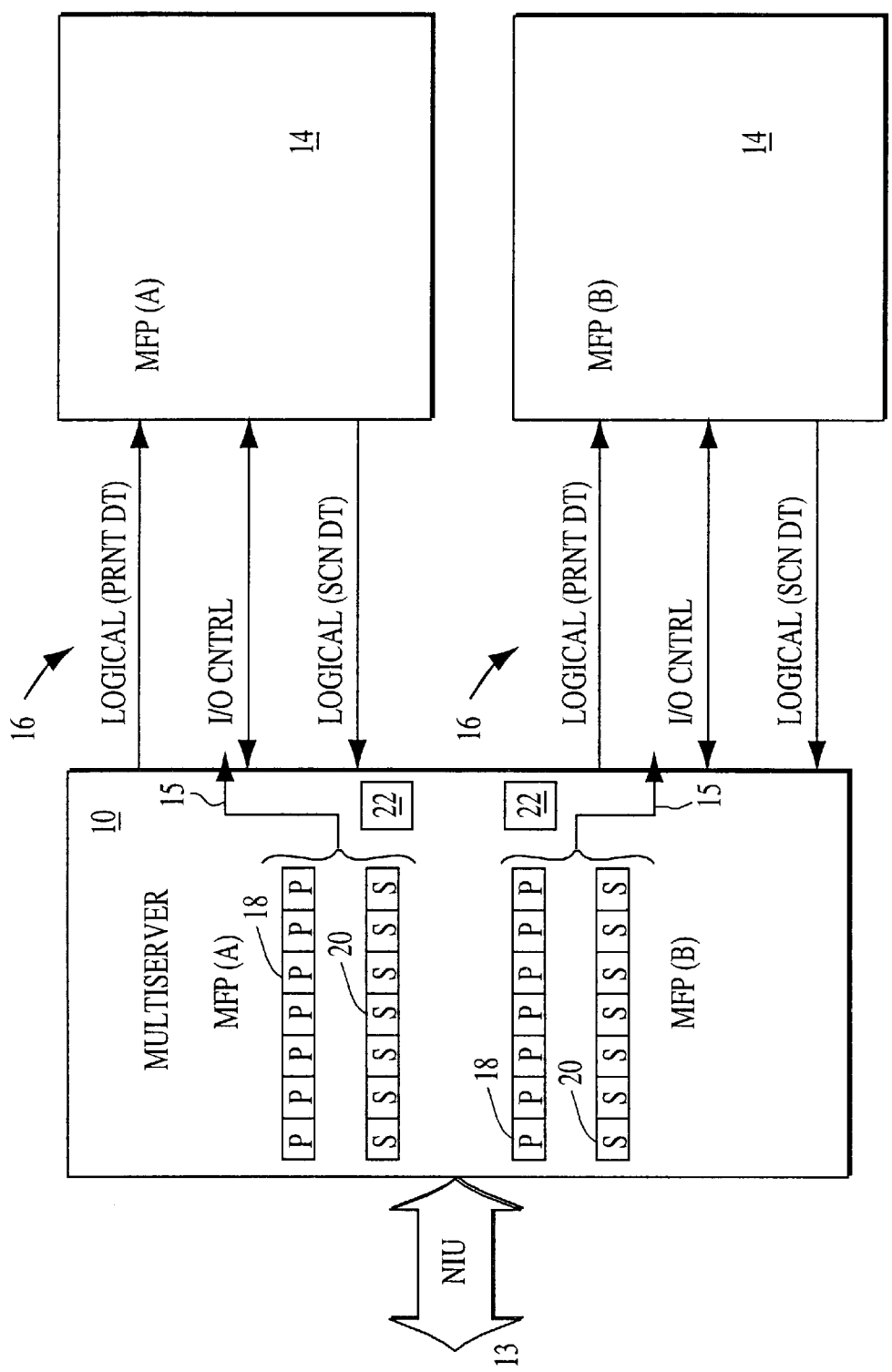
FIG. 2 is a logical block diagram of a preferred server of the invention.

Having access to the multiple logical channels, the simultaneous print and scan operations are performed by the server 10 for a single MFP with corresponding additional MFPs being handled in identical fashion. Referring to FIGS. 1 and 2, the server's actions in accepting and scheduling print and scan jobs for an associated MFP 14 are illustrated. Scan requests and print jobs are accepted by the NIU from clients 12 on the network 13. For each MFP, the server 10 accepts connections for multiple print jobs, but permits transfer of data for a single print job at a time to the server 10. A single scan request for each MFP 14 connected to the server is accepted at any one time, and if an additional request is received prior to completion of execution of a scan request, a "busy" message is sent to the client requesting a scan from the MFP for which the server 10 is already processing a scan request. This limits the amount of memory necessary for the server 10, and also similarly places less demand on the amount of memory necessary for the peripheral 14. Print jobs are prioritized by the order of their access request and once a print job is completed, data for a job that first requested access while the completed job was pending is transferred to the server 10. Retries of scan requests by clients are accepted on a first come, first served basis by the server 10. As is common in the art of network communications, the server 10 maintains address information to link particular print and scan jobs with a particular client 12. This permits data processed pursuant to scan requests to be sent back to the appropriate client 12. In some networks, clients also are notified of completed print jobs, while others do not require such notification. In the latter case, the server need not maintain the address of the client 12 from which the print job was sent.

In a memory, the server 10 maintains a separate print queue 18 and scan queue 20 for each MFP connected to the server. Each of the print and scan queues maintain separate inbound and outbound sections so that communications to the peripheral are separated from those received from the peripheral. The print queue 18 buffers commands and data for transfer to the multifunction peripheral 14. Since most of the data transfer in a print job is to the MFP, the print queue 18 is largely filled at the beginning of a print job. The opposite is true with respect to a scan job, so that the scan queue 20 fills as the job is being completed. A controller 22 for each MFP 14, or a single controller (a CPU) in the server 10, preferably uses the separate logical channels in the communication link 16 in an alternating fashion so that for each print data packet sent to the MFP a corresponding scan data packet is sent to the server 10 from the MFP. Occasionally, an I/O control packet is inserted, for example, to comprise 1% of the packet exchange on the communication link 16. Thus, simultaneous, as used herein, means that the servicing of scan and print jobs is integrated so that neither a scan or print job needs to wait to begin execution on the completing of the other. From a human operator's perspective, the use will largely appear to be truly simultaneous, while the use from a data transfer perspective is actually alternating. Artisans will appreciate that the scan and print packet ratios may be modified and optimized to suit particular network usages, while the alternating packet model will be suitable in most cases.

In some cases, the server 10 will have a MFP 14 attached to one of its ports 15 which is incapable of the simultaneous print and scan operations. This may be due to a device limitation, or a temporary alternate use of the scan function of the device, such as the case where the MFP is also used as a walk up copy service. With the device limitation, the scan function of the MFP will be unavailable whenever a print job is being processed, and the server will notify a client requesting a scan from that MFP that the scan function is unavailable in the same fashion discussed above where the MFP becomes unavailable for scanning because of another scan job. With the temporary alternate use of the scan function case, the unavailability is for a different reason but the same notification of unavailability for scan is used. To ensure that the scan function is not made unavailable for long periods of idle time, an idle time limit, for example 5 minutes, is preferably set for any opened scan channel. After expiration of the idle period, the server 10 closes the scan channel and discards data in the scan queue 20. Also, if a client 12 stops receiving data from a scan job through the NIU, the server 10 closes the scan channel and discards data in the scan queue 20. Finally, connections with the MFP may similarly fail, for example, because of peripheral power off or communication link disconnection.

Figure 3:
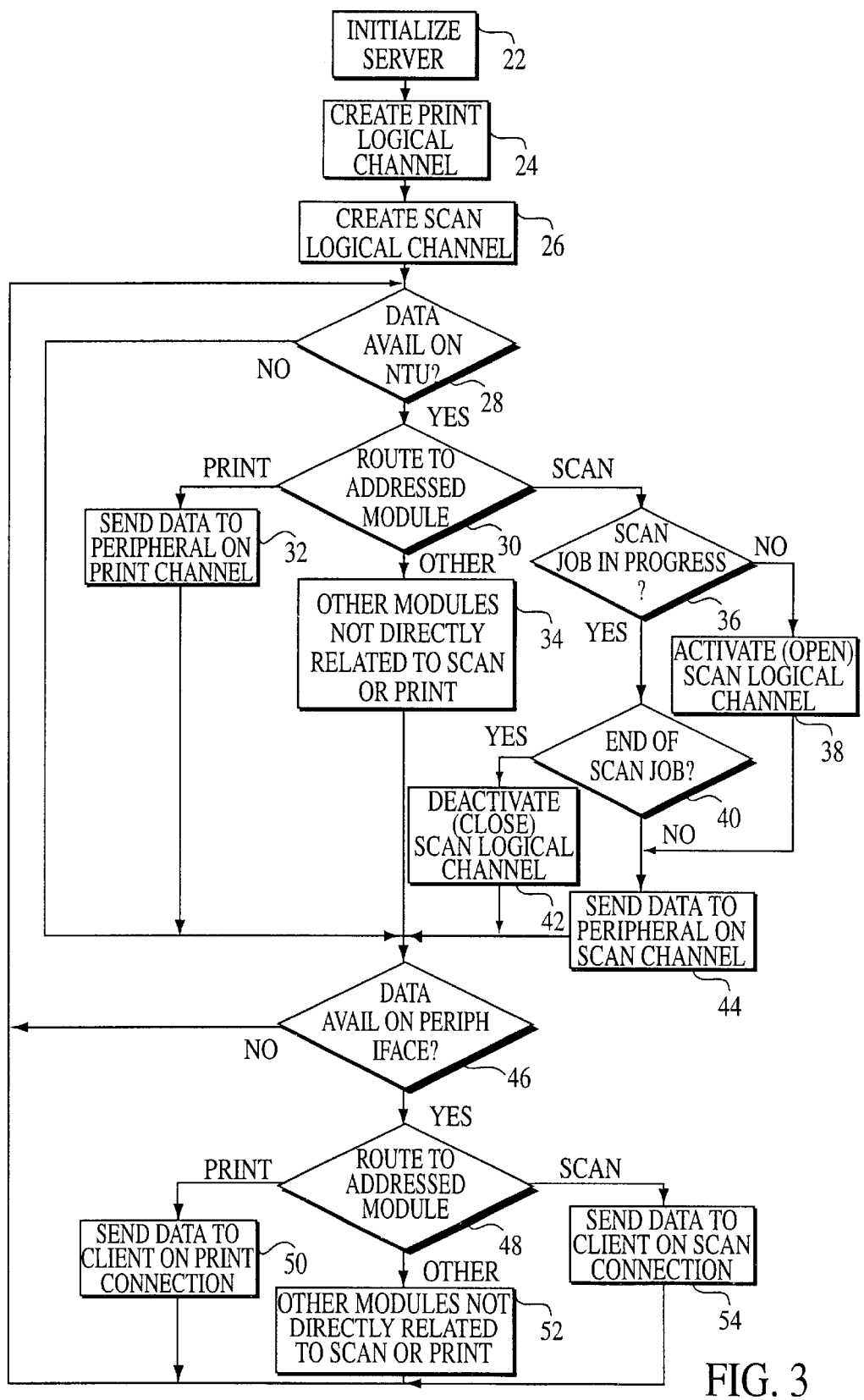
FIG. 3 is a flow diagram illustrating operations of the preferred server of the invention.

Referring now to FIG. 3, specific actions of the server 10 are shown as a logical flow. After device initialization (step 22), i.e., power-up and initialization of CPU, interfaces, program load from static memory, etc., the server 10 creates logical print (step 24) and scan (step 26) channels for each peripheral attached to the server 10. The server then enters its operation loop by monitoring for client data communications by checking for data on the NIU (step 28). Data available on the NIU is routed to its addressed peripheral module (step 30) by buffering it according to the logical print and scan per peripheral buffering arrangement described with reference to FIG. 2. Print jobs are conducted by sending data over the logical print channel (step 32), which preferably comprises about half the available bandwidth if a scan job is simultaneously being executed to the same peripheral. Other types of data not concerning print or scan operations, such as general control information are transmitted (step 34), preferably as a small periodic insertion after a predetermined number of scan and/or print data packets are transmitted.

Scan data results in a check to see if a scan job is currently progressing (step 36). If not, a logical scan channel is opened (step 38). If there was a scan job progressing, a check is made to see if it has completed (step 40). Such completion may be a result of the finish of a scan job, a terminated network connection, or a time-out to avoid a peripheral scan function from being tied up for too long. If it has completed for any reason, the server 10 closes the scan channel (step 42), which has the effect of stopping further data flow between the MFP 14 and the server 10. If it has not completed, data is sent to the MFP 14 on the scan channel (step 44). Data transmitted to the MFP during a scan is parameter information for scanning, as opposed to scan image data which is transmitted in the opposite direction. To this end, a check is made for data on the peripheral interface 15 (step 46). If no data is available on the interface 15, the NIU check is commenced again (step 28).

Data which is available on the peripheral interface 15 is routed to the appropriate logical buffer, e.g., print, scan or other, for sending to the appropriate client 12 (step 48). Print data, which may be a confirmation of a print job progress or completion, is sent to the client 12 if it was available (step 50). Other data, such as control information, is similarly sent to the appropriate client 12 (step 52), as is scan data (step 54), which is primarily composed of image data in an appropriate format, such as TIFF. After any transmission of data to a client through the NIU, the server 10 continues with checking for data on the NIU (step 22). All actions are performed separately and in parallel for separate peripheral interfaces 15 and separate scan and print channels where the server 10 has multiple MFPs 14 attached to it.

The invention thus provides a single server capable of handling both print and scan jobs from clients over a network. The server has the ability to attach to the network independently of other hardware through its own network interface unit. It also provides the ability to support any peripheral having a suitable data port, whether or not the peripheral was designed or intended for networked use. Physical ability of multifunction peripherals to perform simultaneous scans and prints is taken advantage of, since the server manages separate print and scan jobs to a single attached peripheral at the same time, allowing both to progress. The print and scan job logical buffering is easily duplicated to provide the ability of the present server to serve multiple peripherals from a single network interface. From the above, artisans will appreciate these and many other advantages of the present invention.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A server for connecting a print and scan multifunction peripheral having scan and print capabilities to a network, comprising:
   a network interface unit for communicating according to a predetermined network protocol with a plurality of clients on the network;
   a communication port for connection to a multifunction peripheral through a communication link;
   separate logical print and scan channels for exchanging data through the port and over the link; and
   a simultaneous print and scan communication controller utilizing said logical print and scan channels to permit simultaneous print and scan operations through said communication port in response to requests received from one or more of said plurality of clients over said network.

2. The server according to claim 1, wherein said controller coordinates alternate sending of print data packets on said logical print channel and receiving of scan data packets on said logical scan channel.

3. The server according to claim 2, wherein said controller further periodically permits exchange of control data packets after a predetermined number of scan and print data packets.

4. The server according to claim 1, further comprising:
a logical print queue linked to said communication port and said network interface unit; and
a logical scan queue linked to said communication port.

5. The server according to claim 4, further comprising:
one or more additional communication ports;
an additional print queue for each of said one or more additional communication ports, each additional print queue being linked to said network interface unit;
an additional scan queue for each of said one or more additional communication ports, each additional scan queue being linked to said network interface unit.

6. The server according to claim 5, wherein said controller uses a predetermined peripheral protocol for said communication port and a different communication protocol with at least one of said one or more additional communication ports.

7. The server according to claim 1, wherein said network interface unit communicates according to a plurality of network communication protocols.

8. The server according to claim 1, wherein said controller closes a scan channel after a predetermined period of idle time during a scan job and discards data packets in said scan queue upon closing said scan channel.

9. The server according to claim 1, wherein said controller closes a scan channel if a client associated with a scan job stops receiving data from said scan queue before the scan job is completed.

10. The server according to claim 1, wherein said controller closes a scan channel if a peripheral associated with a scan job stops sending data to the server before the scan job is completed.

11. The server according to claim 1, wherein the controller notifies a client of peripheral unavailability if the client requests an unavailable peripheral function.

12. A method for managing data flow between a network having a predetermined communication protocol and a multifunction peripheral having separate print and scan capabilities, the method comprising steps of:

creating separate logical scan and print channels for communication with the multifunction peripheral;

print waiting to receive a print job from a client over the network;

scan waiting, simultaneous with said print waiting, to receive a scan request from a client over the network;

print executing a received print job to the multifunction peripheral over said print channel, while performing said scan waiting or execution of a scan request; and scan executing a received scan request from the multifunction peripheral over said scan channel, while performing said print waiting or said print executing step.

13. The method of claim 12, wherein print and scan data packets are respectively alternately transmitted and received to perform a simultaneous execution of said print executing and said scan executing steps.

14. The method according to claim 12, further comprising a step of closing said scan channel after a predetermined period of idle time passes during a scan job.

* * * * *